US008768260B2

(12) United States Patent
Tsukamoto et al.

(10) Patent No.: US 8,768,260 B2
(45) Date of Patent: Jul. 1, 2014

(54) ELECTROMAGNETIC WAVE DISCRIMINATION DEVICE, ELECTROMAGNETIC WAVE DISCRIMINATION METHOD, AND ELECTROMAGNETIC WAVE DISCRIMINATION PROGRAM

(75) Inventors: Kenta Tsukamoto, Tokyo (JP); Manabu Kusumoto, Tokyo (JP); Naoki Natsume, Tokyo (JP)

(73) Assignee: Nec Corporation, Tokyo (JP)

( * ) Notice: Subject to any disclaimer, the term of this patent is extended or adjusted under 35 U.S.C. 154(b) by 400 days.

(21) Appl. No.: 13/185,234

(22) Filed: Jul. 18, 2011

(65) Prior Publication Data

US 2012/0021710 A1  Jan. 26, 2012

(30) Foreign Application Priority Data

Jul. 26, 2010 (JP) .............................. P2010-167186
May 25, 2011 (JP) .............................. P2011-116745

(51) Int. Cl.
*H04B 17/00* (2006.01)

(52) U.S. Cl.
USPC ...................................... 455/67.11; 455/63.1

(58) Field of Classification Search
USPC .............................. 455/67.11, 63.1
See application file for complete search history.

(56) References Cited

U.S. PATENT DOCUMENTS

| 6,509,728 | B1 | 1/2003 | Uchino et al. | |
|---|---|---|---|---|
| 2006/0084388 | A1* | 4/2006 | Li et al. | 455/67.11 |
| 2009/0143019 | A1* | 6/2009 | Shellhammer | 455/67.11 |
| 2010/0075704 | A1* | 3/2010 | McHenry et al. | 455/509 |
| 2010/0184384 | A1* | 7/2010 | Jones et al. | 455/67.11 |
| 2010/0233963 | A1* | 9/2010 | Harada et al. | 455/63.3 |
| 2012/0094618 | A1* | 4/2012 | Harada et al. | 455/84 |

FOREIGN PATENT DOCUMENTS

| CN | 101359056 A | 2/2009 |
|---|---|---|
| JP | 9-218230 A | 8/1997 |
| JP | 2007206037 A | 8/2007 |

OTHER PUBLICATIONS

Chinese Office Action for CN Application No. 201110209446.1 issued on Nov. 5, 2013 with English Translation.

* cited by examiner

*Primary Examiner* — Lewis West
(74) *Attorney, Agent, or Firm* — Sughrue Mion, PLLC

(57) ABSTRACT

An electromagnetic wave discrimination device according to the present invention discriminates electromagnetic waves, and includes an acquisition section, a feature quantity calculation section, a similarity calculation section, a classification section, a discrimination section, an output section, and a storage section. The acquisition section receives communication signals of a predetermined frequency, and samples waveform data of the communication signals every predetermined time to obtain sample data for each predetermined time. The feature quantity calculation section calculates amplitude feature quantities for each predetermined time, based on the sampling data for each predetermined time. The similarity calculation section calculates degrees of similarity with respect to the amplitude feature quantities for each predetermined time. The classification section classifies the communication signals for each predetermined time into clusters to obtain cluster analysis results of the communication signals for each predetermined time, based on the degrees of similarity. The discrimination section discriminates communication signals constituting one cluster for each of the clusters to obtain discrimination results, based on the cluster analysis results of the communication signals for each predetermined time. The output section outputs the discrimination results. The storage section stores the amplitude feature quantities, the degrees of similarity, the cluster analysis results, and the discrimination results.

7 Claims, 12 Drawing Sheets

| | AMPLITUDE PROBABILITY DISTRIBUTION | AMPLITUDE HISTOGRAM | MEASUREMENT TIME |
|---|---|---|---|
| SAMPLE 1 | ... | ... | 06/30 10:30'01 |
| SAMPLE 2 | ... | ... | 06/30 10:30'02 |
| SAMPLE 3 | ... | ... | 06/30 10:30'03 |
| ⋮ | ⋮ | ⋮ | ⋮ |
| SAMPLE 60 | ... | ... | 06/30 10:31'00 |

|  | SAMPLE 1 | SAMPLE 2 | SAMPLE 3 | ... | SAMPLE 60 |
|---|---|---|---|---|---|
| SAMPLE 1 |  | 0.88 | 0.70 | ... | 0.80 |
| SAMPLE 2 |  |  | 0.61 | ... | 0.84 |
| SAMPLE 3 |  |  |  | ... | 0.72 |
| ⋮ |  |  |  |  | ⋮ |
| SAMPLE 60 |  |  |  |  |  |

FIG. 6

| | SAMPLE 1 | SAMPLE 4 | SAMPLE 5 | ... | SAMPLE 58 | SAMPLE 59 | SAMPLE 60 |
|---|---|---|---|---|---|---|---|
| SAMPLE 2 | 0.88 | 0.68 | 0.74 | ... | 0.73 | 0.82 | 0.84 |
| SAMPLE 3 | 0.70 | 0.86 | 0.91 | ... | 0.84 | 0.87 | 0.72 |
| | ⇨ C2 | ⇨ C1 | ⇨ C1 | | ⇨ C1 | ⇨ C1 | ⇨ C2 |

ELECTROMAGNETIC WAVE DISCRIMINATION DEVICE, ELECTROMAGNETIC WAVE DISCRIMINATION METHOD, AND ELECTROMAGNETIC WAVE DISCRIMINATION PROGRAM

This application is based upon and claims the benefit of priority from Japanese patent application No. 2010-167186, filed on Jul. 26, 2010, and Japanese patent application No. 2011-116745, filed on May 25, 2011, the disclosures of which are incorporated herein in their entirety by reference.

BACKGROUND OF THE INVENTION

1. Field of the Invention

The present invention relates to an electromagnetic wave discrimination device, an electromagnetic wave discrimination method, and an electromagnetic wave discrimination program that discriminates electromagnetic waves.

2. Description of Related Art

Accompanying the popularization of wireless communication, the demand for electric wave usage in mobile telecommunications is increasing. On the other hand, due to electromagnetic interference of interfering waves in this frequency band, wireless communication disturbances in portable telephones, wireless LAN, and the like, and poor reception in television, radio, and the like often occur. Therefore, with an object of improving throughput, it is required to discriminate interfering waves, and perform detection processing for electromagnetic interference. As a method for realizing this electromagnetic wave discrimination, and electromagnetic interference detection, various proposals have been made.

The electromagnetic environment observation device disclosed in Japanese Unexamined Patent Application, First Publication No. H09-218230 (hereunder referred to as Patent Document 1) identifies radiation sources of unnecessary radiation by estimating the quality of wireless communications based on the result of observing the electromagnetic environment, and classifying the observed electromagnetic environment. The electromagnetic environment observation device disclosed in Patent Document 1 estimates the quality of wireless communications by calculating an amplitude probability distribution (APD) as a feature quantity of the waveform of the electromagnetic wave.

With regard to the signal measurement and analysis device disclosed in Japanese Unexamined Patent Application, First Publication No. 2007-206037 (hereunder referred to as Patent Document 2), as well as storing and analyzing waveform data, by analyzing the features and similarities of the stored waveform data, and displaying the results thereof, the electromagnetic environment and the noise environment is grasped by the user.

With regard to the electromagnetic environment observation device disclosed in Patent Document 1, the ADP, which is the probability distribution of the amplitude fluctuations, is used as the feature quantity, to estimate the bit error rate or throughput. In this device it is assumed that the prior information for the modulation system for the interfering communication, or for the strength has been obtained, so that it is difficult to correspond to the changes in the electric wave environment due to the reception sites.

With regard to the signal measurement and analysis device disclosed in Patent Document 2, a single parameter estimation of the waveform peak value or mean value or the like in an arbitrary time domain is used as the waveform parameter used in the characterization of the waveform data. With this conventional measurement parameter, it is difficult to accurately discriminate the electromagnet environment which has become complicated with the advances in communication technology. Moreover, in order to estimate accurately, the system configuration has become large scale, and hence it is not suitable for adaption to mobile facilities.

SUMMARY OF THE INVENTION

The present invention has been achieved in order to solve the aforementioned problems.

An electromagnetic wave discrimination device according to the present invention discriminates electromagnetic waves, and includes: an acquisition section that receives communication signals of a predetermined frequency, and samples waveform data of the communication signals every predetermined time to obtain sample data for each predetermined time; a feature quantity calculation section that calculates amplitude feature quantities for each predetermined time, based on the sampling data for each predetermined time; a similarity calculation section that calculates degrees of similarity with respect to the amplitude feature quantities for each predetermined time; a classification section that classifies the communication signals for each predetermined time into clusters to obtain cluster analysis results of the communication signals for each predetermined time, based on the degrees of similarity; a discrimination section that discriminates communication signals constituting one cluster for each of the clusters to obtain discrimination results, based on the cluster analysis results of the communication signals for each predetermined time; an output section that outputs the discrimination results; and a storage section that stores the amplitude feature quantities, the degrees of similarity, the cluster analysis results, and the discrimination results.

An electromagnetic wave discrimination method according to the present invention is used for an electromagnetic wave discrimination device that discriminates electromagnetic waves. The method includes: receiving communication signals of a predetermined frequency, and sampling waveform data of the communication signals every predetermined time to obtain sample data for each predetermined time; calculating amplitude feature quantities for each predetermined time, based on the sampling data for each predetermined time; calculating degrees of similarity with respect to the amplitude feature quantities for each predetermined time; classifying the communication signals for each predetermined time into clusters to obtain cluster analysis results of the communication signals for each predetermined time, based on the degrees of similarity; discriminating communication signals constituting one cluster for each of the clusters to obtain discrimination results, based on the cluster analysis results of the communication signals for each predetermined time; outputting the discrimination results; and storing the amplitude feature quantities, the degrees of similarity, the cluster analysis results, and the discrimination results.

A computer-readable storage medium according to the present invention stores an electromagnetic wave discrimination program. The program makes a computer execute: an acquisition function of receiving communication signals of a predetermined frequency, and sampling waveform data of the communication signals every predetermined time obtain sample data for each predetermined time; a feature quantity calculation function of calculating amplitude feature quantities for each predetermined time, based on the sampling data for each predetermined time; a similarity calculation function of calculating degrees of similarity with respect to the amplitude feature quantities for each predetermined time; a classification function of classifying the communication signals for each predetermined time into clusters to obtain cluster analysis results of the communication signals for each predetermined time, based on the degrees of similarity; a discrimination function of discriminating communication signals constituting one cluster for each of the clusters to obtain discrimination results, based on the cluster analysis results of the communication signals for each predetermined time; an output function of outputting the discrimination results; and a storage function of storing the amplitude feature quantities, the degrees of similarity, the cluster analysis results, and the discrimination results.

According to the present invention, the electromagnetic wave discrimination device classifies the waveform of the received electromagnetic waves based on the degree of similarities of the feature quantities of the waveform. Therefore, the characteristics of the electromagnetic waves can be accurately discriminated, without the necessity of prior information of the electromagnetic wave environment. As a result the generation of electromagnetic interference of the communication signal in simple equipment components can be automatically identified.

BRIEF DESCRIPTION OF THE DRAWINGS

FIG. 6 is a table showing the process by which the waveform samples are classified into clusters based on the degrees of similarity, in the first exemplary embodiment of the present invention.

EXEMPLARY EMBODIMENT

First Exemplary Embodiment

Figure 1:
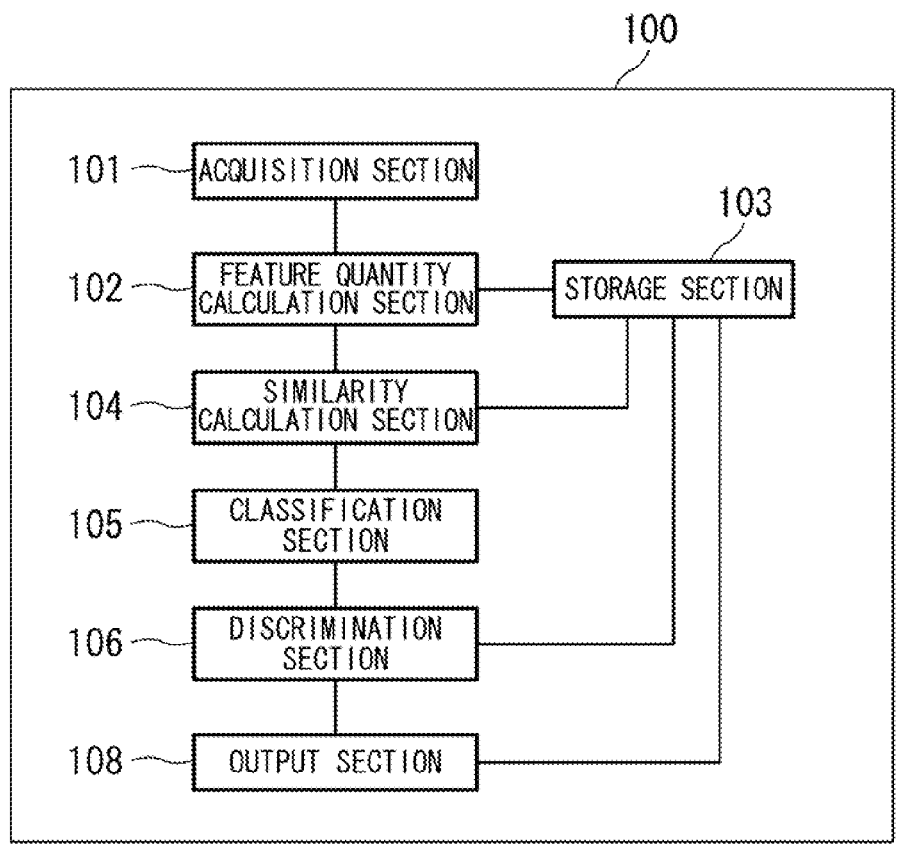
FIG. 1 is a block diagram showing the configuration of an electromagnetic wave discrimination device according to a first exemplary embodiment of the present invention.

A first exemplary embodiment of the present invention is described in detail with reference to the drawings. FIG. 1 is a block diagram showing the configuration of an electromagnetic wave discrimination device 100 according to the first exemplary embodiment. The electromagnetic wave discrimination device 100 includes an acquisition section 101, a feature quantity calculation section 102, a storage section 103, a similarity calculation section 104, a classification section 105, a discrimination section 106, and an output section 108.

The acquisition section 101 receives electromagnetic waves, and samples the waveform of the received electromagnetic wave (incoming electrical wave) for each predetermined time and supplies them to the feature quantity calculation section 102. Moreover, the acquisition section 101 supplies the measurement date (time received) of the received electromagnetic wave for each predetermined time to the feature quantity calculation section 102. The acquisition section 101 may be for example a spectrum analyzer (measurement device) that measures the amplitude of a waveform. The acquisition section 101 may acquire data that indicates the waveform or the amplitude of the waveform, from another device.

The feature quantity calculation section 102 receives the amplitude data of the received electromagnetic wave, and the measurement date (time received) at each predetermined time. The feature quantity calculation section 102 adds the discrimination information that is output at each predetermined time, and creates a "waveform sample" (for example, Sample 1, Sample 2, and so on). Moreover, the feature quantity calculation section 102 calculates the feature quantity of the received electromagnetic wave for each waveform sample. Here, the feature quantity is the amplitude probability distribution, for example. The amplitude probability distribution is a probability distribution that shows the ratio between the entire length of time of the waveform, and the length of time in which the waveform exceeds a predetermined amplitude. The feature quantity calculation section 102 outputs each of the feature quantities with respect to the electric waves received at each predetermined time for which discrimination information has been added.

The feature quantity of the received electric waves is not necessarily limited to an amplitude probability distribution. For example, the feature quantity of the received electric waves may include at least one or more among statistical quantities such as; an amplitude histogram, a mean value, a standard deviation, a degree of distortion, a kurtosis, a peak factor, or a moment of the probability distribution, and the measurement date.

Figures 2, 3:
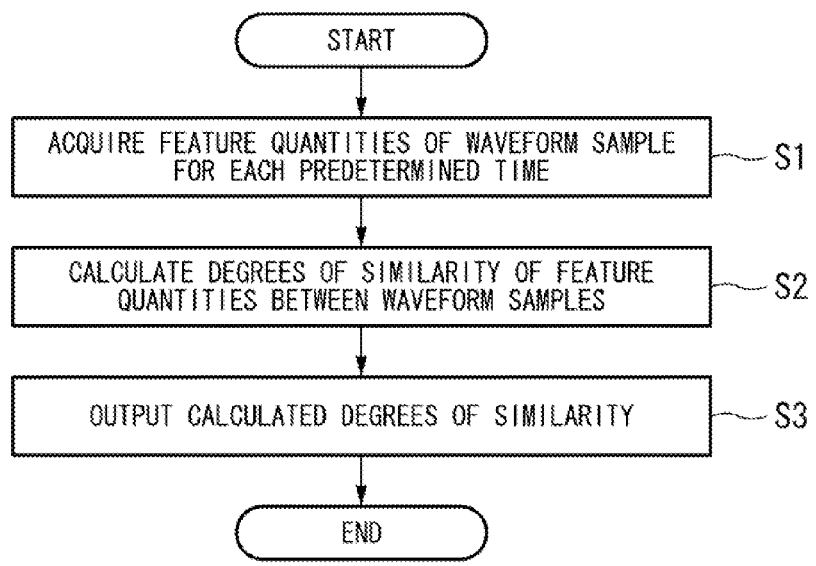
FIG. 2 is a table showing a data configuration example of the feature quantities of waveform samples, in the first exemplary embodiment of the present invention.
FIG. 3 is a flowchart showing the sequence by which a degree of similarity is calculated in the first exemplary embodiment of the present invention.

The storage section 103 stores the feature quantities of the received electric waves for each waveform sample. FIG. 2 shows a data configuration example of the feature quantities for each waveform sample. As one example, in FIG. 2, a case where the feature quantities of the received electric waves are an amplitude probability distribution, an amplitude histogram, and the measurement time, is shown. Moreover, the storage section 103 may also store a predetermined reception frequency and reception time for the received electromagnetic wave.

Returning to FIG. 1, the description of the configuration of the electromagnetic wave discrimination device 100 is continued. The calculation section 104 receives the feature quantities of the received electromagnetic waves for each waveform sample. The similarity calculation section 104 calculates the degrees of similarity of the feature quantities between the waveform samples, and creates a similarity matrix.

FIG. 3 is a flowchart showing the sequence by which the degrees of similarity are calculated. The similarity calculation section 104 acquires the feature quantities of the waveform sample for each predetermined time (step S1). The similarity calculation section 104 calculates the degrees of similarity of the feature quantities between the waveform samples (step S2). The similarity calculation section 104 outputs the calculated degrees of similarity (step S3).

Figures 4, 5:
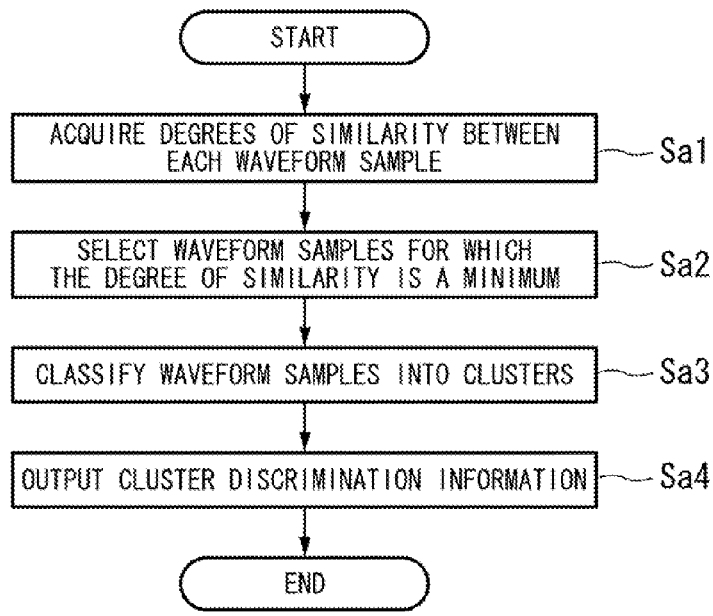
FIG. 4 is a table showing an example of the degrees of similarity between waveform samples calculated in a similarity calculation section, in the first exemplary embodiment of the present invention.
FIG. 5 is a flowchart showing the sequence by which waveform samples are classified into clusters, in the first exemplary embodiment of the present invention.

FIG. 4 shows an example of the degrees of similarity detected by the similarity calculation section 104. Here, as one example, a case is shown where the degrees of similarity are Pearson's correlation coefficients. In order to increase the accuracy of discriminating the electromagnetic waves, it is desirable for the specimen number of waveform samples to be made sufficiently large. As a correlation coefficient, in a case where the number of waveform samples is n (where n is an integer of 2 or more), a maximum of $_nC_2$ degrees of similarity are calculated, to form the correlation coefficient. Hereunder, as one example, a case where the degree of similarity between Sample 2 and Sample 3 is "0.61", wherein this degree of similarity is the smallest degree of similarity among the degrees of similarities between all waveform samples, is described.

Returning to FIG. 1, the description of the configuration of the electromagnetic wave discrimination device 100 is continued. The classification section 105 acquires the degrees of similarity for each waveform sample, and classifies the waveform samples into clusters, based on the acquired degrees of similarity.

FIG. 5 is a flowchart showing the sequence by which the waveform samples are classified into clusters. The classification section 105 acquires the degrees of similarity between each of the waveform samples, from the similarity calculation section 104 (step Sa1). The classification section 105 selects the waveform samples (here, Samples 2 and 3) for which the degree of similarity is a minimum (step Sa2). The classification section 105 classifies the waveform samples into clusters (step Sa3). The classification section 105 outputs the cluster discrimination information for each waveform sample (step Sa4). Here, the cluster discrimination information is discrimination information for discriminating the classified cluster. Hereunder, the cluster discrimination information is denoted CN (where N is an integer of 1 or more), and is denoted C1, C2, and so on.

FIG. 6 shows the process in which the waveform samples are classified into clusters based on the degrees of similarity. The variables (feature quantities of the waveform samples) used in the classification into clusters are ideally mutually independent and without similarity. This is because by keeping the distance between the clusters separated, the discrimination accuracy of the electromagnetic waves is improved. Consequently, the classification section 105 selects the pair of waveform samples in which the degree of similarity among the similarity matrix is smallest. As in the leftmost column of the table shown in FIG. 6, the classification section 105 selects Sample 2 and Sample 3, which have the smallest degree of similarity among the degrees of similarity between all waveform samples (refer to FIG. 4).

The classification section 105 classifies the waveform samples into clusters, based on the degrees of similarity of the selected Sample 2 and Sample 3, and the other samples. Specifically, the classification section 105 classifies the samples in which the degree of similarity with Sample 2 is higher than the degree of similarity with Sample 3, into Cluster C2.

Furthermore, the classification section 105 classifies the samples in which the degree of similarity with Sample 3 is higher than the degree of similarity with Sample 2, into Cluster C1. By means of such a classification, the classification section 105 classifies into the electromagnetic waveform component similar to that of selected Sample 2, and an electromagnetic waveform component similar to that of Sample 3.

As cluster analysis methods at the time when the classification section 105 classifies the waveform samples into clusters, hierarchical cluster analysis methods (for example, the shortest distance method, the median method, the centroid method, the group average method, or the Ward method), and non-hierarchical cluster analysis methods (for example, the k-means method, the fuzzy-type clustering method, or the self-organization processing method), are applicable. The classification section 105 appropriately selects the cluster analysis method so that the shape of the clusters is not distorted.

Figure 7:
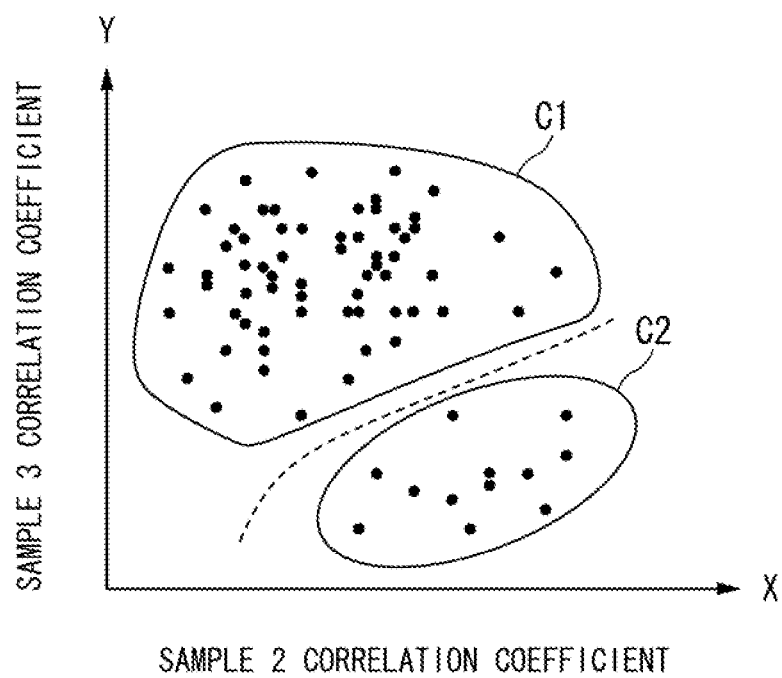
FIG. 7 shows an example of the waveform samples classified into two clusters, in the first exemplary embodiment of the present invention.

FIG. 7 shows an example in which the waveform samples have been classified into two clusters (C1 and C2). The correlation coefficient between Sample 2 and the other samples (except Sample 3) is shown by the X-axis. The correlation coefficient between Sample 3 and the other samples (except Sample 2) is shown by the Y-axis.

In order to discriminate the electromagnetic waves, at least two clusters are necessary. The optimum value of the number of clusters changes according to the electromagnetic environment and the installation location of the sensor station that receives the electromagnetic waves. Therefore an appropriate algorithm may be used at the time the optimum value of the number of clusters is determined.

Returning to FIG. 1, the description of the configuration of the electromagnetic wave discrimination device 100 is continued. The discrimination section 106 determines the features of the electromagnetic waves that correspond to the waveform samples that constitute the cluster indicated by the cluster discrimination information. Here, the discrimination section 106 compares and references the number of waveform samples and data that constitute the clusters (refer to FIGS. 2, 4, and 6), and information showing the reception frequency and time, to thereby discriminate the features of the electromagnetic waves. As a result, the discrimination section 106 is able to discriminate that the electromagnetic waves that correspond to the waveform samples that constitute cluster C1 are affected waves (harmful waves), and that the electromagnetic waves that correspond to the waveform samples that constitute cluster C2 are interfering waves.

The output section 108 may be for example a display or a printer. The output section 108 acquires the discrimination results from the discrimination section 106, and outputs (displays) the discrimination results. The output section 108 displays to the effect that the electromagnetic waves that correspond to the waveform samples that constitute cluster C1 are affected waves, and that the electromagnetic waves that correspond to the waveform samples that constitute cluster C2 are interfering waves, as the discrimination result for example.

As described above, the electromagnetic wave discrimination device 100 includes an acquisition section 101 that samples the waveform of the received electromagnetic wave at each predetermined time, a feature quantity calculation section 102 that calculates the feature quantity of the waveform for each waveform sample, a similarity calculation section 104 that calculates the degree of similarity of the feature quantity between the waveform samples, a classification section 105 that classifies the waveform samples into clusters based on the degrees of similarity, and a discrimination section 106 that discriminates the electromagnetic waves that correspond to the waveform samples that constitute the clusters.

The electromagnetic wave discrimination device classifies the waveforms of the received electromagnetic waves based on the degrees of similarity of the feature quantities of the waveforms, and hence the features of the electromagnetic waves can be accurately discriminated.

As the feature quantity, a quantity corresponding to the amplitude of the waveform (for example the amplitude probability distribution) may be multiply used. As a result, the electromagnetic wave discrimination device is able to more accurately discriminate based on the quantity corresponding to the amplitude of the waveform of the received electromagnetic wave, even under an environment in which a plurality of electromagnetic waves are mixed.

The electromagnetic wave discrimination device 100 stores the information for predetermined frequency and time for the electromagnetic wave in a storage section 103, and the discrimination section 106 discriminates the electromagnetic wave based on at least one among the predetermined frequency and time. As a result, the electromagnetic wave discrimination device 100 can accurately discriminate spontaneously generated electromagnetic waves.

Second Exemplary Embodiment

A second exemplary embodiment of the present invention is described in detail with reference to the drawings. The second exemplary embodiment differs from the first exemplary embodiment in the point that the electromagnetic wave discrimination device determines whether or not electromagnetic interference is occurring in the electromagnetic wave, based on teaching data.

Figure 8:
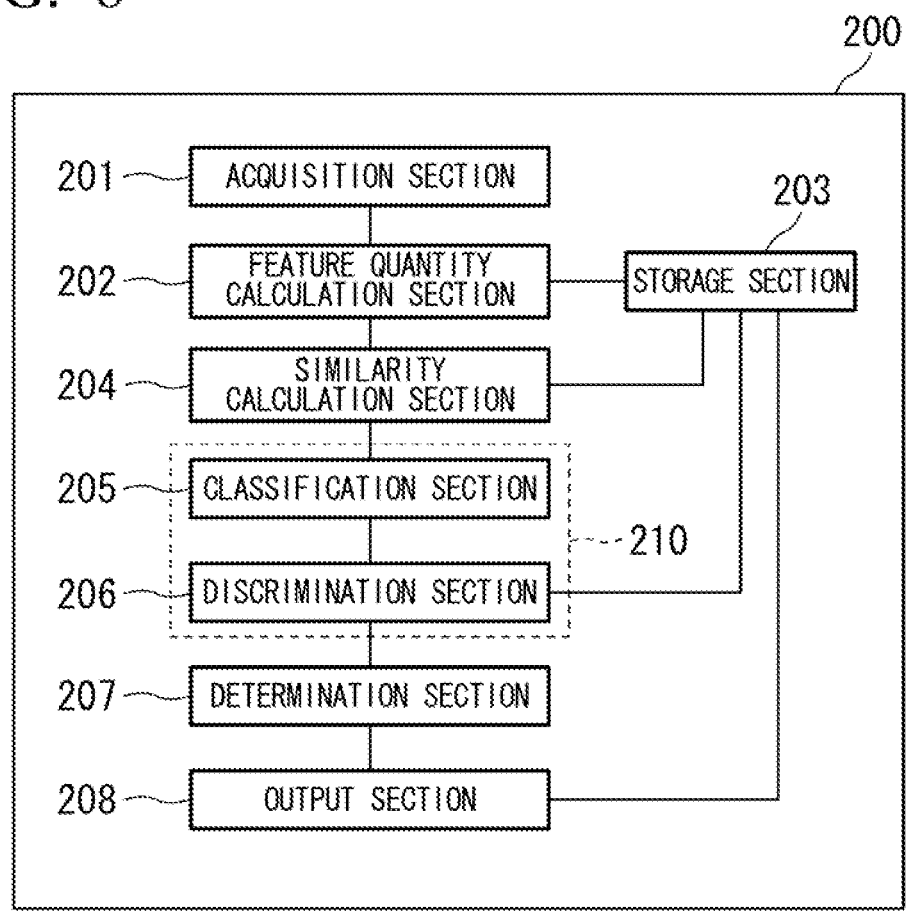
FIG. 8 is a block diagram showing the configuration of an electromagnetic wave discrimination device according to a second exemplary embodiment of the present invention.

FIG. 8 is a block diagram showing the configuration of an electromagnetic wave discrimination device according to the second exemplary embodiment of the present invention. The electromagnetic wave discrimination device 200 determines whether or not electromagnetic interference is occurring in the electromagnetic wave, by calculating the degree of similarity between the feature quantities of the waveform samples and the teaching data. The electromagnetic wave discrimination device 200 includes an acquisition section 201, a feature quantity calculation section 202, a storage section 203, a similarity calculation section 204, a teaching data selection section 210 (classification section 205, discrimination section 206), a determination section 207, and an output section 208.

The function of the acquisition section 201 is the same as that of the acquisition section 101 in the first exemplary embodiment. The function of the feature quantity calculation section 202 is the same as that of the feature quantity calculation section 102 in the first exemplary embodiment. The storage section 203 stores the feature quantities of the waveform samples calculated by the feature quantity calculation section 202 for each waveform sample.

The teaching data selection section 210 includes the classification section 205 and the discrimination section 206. The teaching data selection section 210 acquires the feature quantities of the waveform samples from the storage section 203 for each waveform sample. The teaching data selection section 210 selects one waveform sample from the plurality of acquired waveform samples, and sets the feature quantities of the selected waveform sample as teaching data.

The classification section 205 is the same as the classification section 105 in the first exemplary embodiment. The discrimination section 206 selects one waveform sample from the waveform samples, and sets the feature quantities of the selected waveform sample as teaching data. As the method for determining the teaching data, for example the centroid position of the cluster is calculated, and the waveform sample that is closest to the calculated centroid position is selected as the teaching data.

The discrimination section 206 discriminates feature quantities of the electromagnetic waves that correspond to the waveform samples that constitute the cluster indicated by the cluster discrimination information. Generally, it is anticipated that the time in which the electromagnetic wave discrimination device 200 is receiving illegal electric waves from illegal radio stations is small, and the time in which it is receiving legal electric waves from legal radio stations is a vast majority. Consequently, the discrimination section 206 is able to discriminate legal electric waves from legal radio stations and illegal electric waves from other illegal radio stations by counting the number of waveform samples that constitute the cluster.

Figure 9:
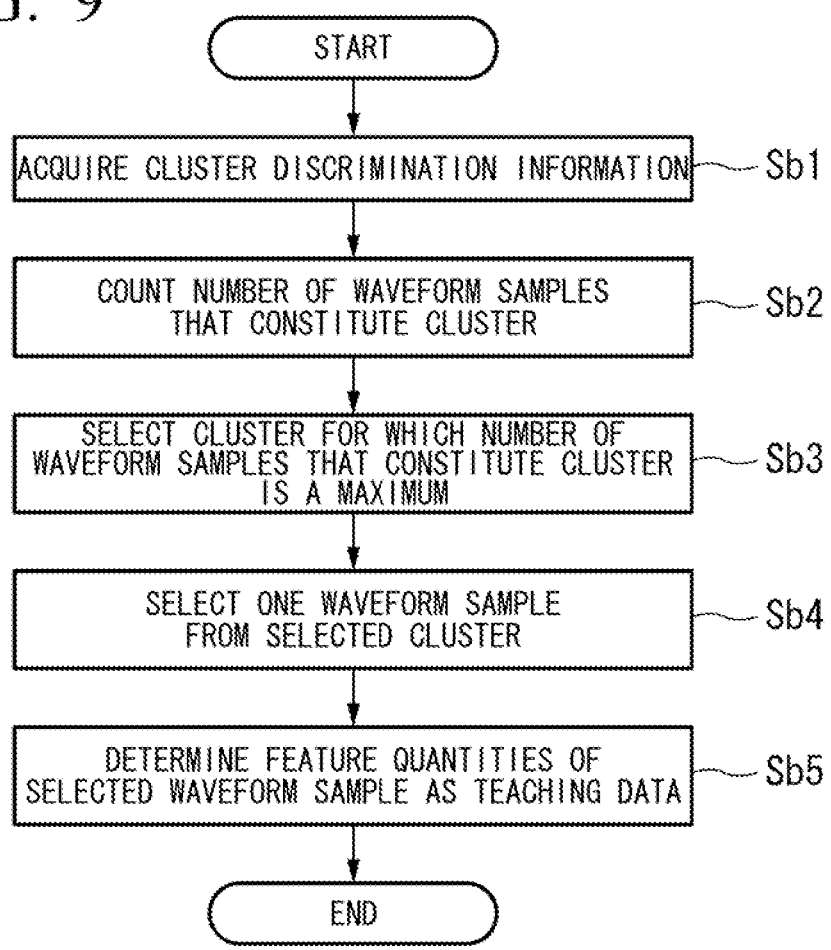
FIG. 9 is a flowchart showing the sequence by which teaching data is created, in the second exemplary embodiment of the present invention.

FIG. 9 is a flowchart showing the sequence in which the teaching data is selected. The discrimination section 206 acquires the cluster discrimination information for each waveform sample (step Sb1). The discrimination section 206 counts the number of waveform samples that constitute the cluster (step Sb2). The discrimination section 206 selects the cluster for which the number of waveform samples that constitute the cluster is a maximum (step Sb3). The discrimination section 206 selects one waveform sample from the selected cluster (step Sb4). Then, the discrimination section 206 determines the feature quantities of the selected waveform sample as the teaching data, and the determined teaching data is stored in the storage section 203 (step Sb5).

Returning to FIG. 8, the description of the configuration of the electromagnetic wave discrimination device 200 is continued. The similarity calculation section 204, based on the feature quantities of the received electric waves newly sampled by the acquisition section 201, and the teaching data stored in the storage section 203, calculates the degree of similarity thereof.

The determination section 207 determines whether or not electromagnetic interference is occurring in the electromagnetic wave corresponding to the waveform sample sampled by the acquisition section 201, by comparing the magnitudes of a predetermined threshold and the degree of similarity. In a case where electromagnetic interference is occurring in the electromagnetic wave, the degree of similarity changes since the feature quantity of the waveform sample changes due to the influence of the electromagnetic interference. Consequently, by comparing the magnitudes of the predetermined threshold and the degree of similarity, the determination section 207 can determine whether or not electromagnetic interference is occurring in the electromagnetic wave.

The output section 208 may be for example a display or a printer. The output section 208, in a case where the determination section 207 determines that electromagnetic interference is occurring in the electromagnetic wave, outputs to the effect that electromagnetic interference is occurring in the electromagnetic wave.

Figure 10:
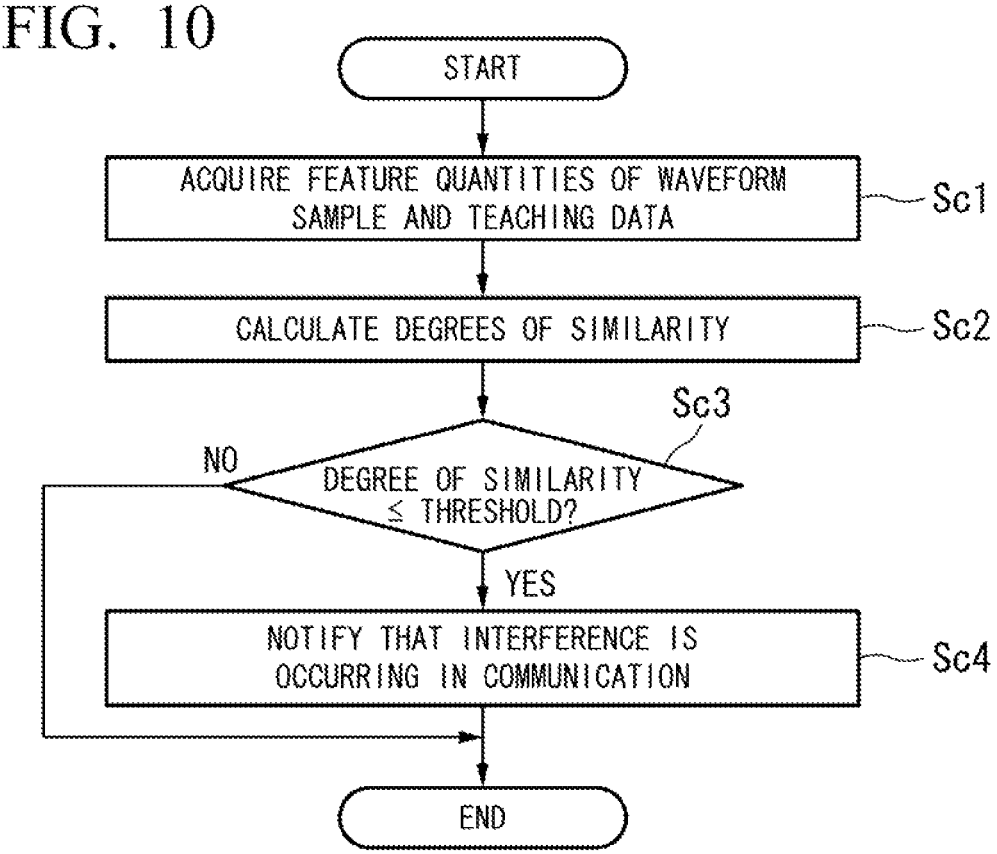
FIG. 10 is a flowchart showing the sequence by which it is determined whether or not electromagnetic interference is occurring in the electromagnetic wave, in the second exemplary embodiment of the present invention.

FIG. 10 is a flowchart showing the sequence by which it is determined whether or not electromagnetic interference is occurring in the electromagnetic wave. The similarity calculation section 204 acquires the feature quantities of the waveform sample newly sampled by the acquisition section 201, and the teaching data stored in the storage section 203 (step Sc1). The similarity calculation section 204 calculates the degrees of similarity between the feature quantities of the waveform sample and the teaching data (step Sc2).

The determination section 207 compares the magnitudes of the predetermined threshold and the degree of similarity. Specifically, the determination section 207 determines whether or not the degree of similarity is less than or equal to the predetermined threshold (step Sc3). In a case where the degree of similarity is less than or equal to the predetermined threshold (step Sc3—YES), the output section 208 notifies that electromagnetic interference is occurring in the electromagnetic wave (step Sc4). On the other hand, in a case where the degree of similarity is greater than the predetermined threshold (step Sc3—NO), the determination section 207 finishes the sequence that determines whether electromagnetic interference is occurring in the electromagnetic wave. The process that determines whether or not electromagnetic interference is occurring in the electromagnetic wave may be executed repeatedly.

As described above, the electromagnetic wave discrimination device 200 includes a determination section 207 that determines whether or not electromagnetic interference is occurring in the electromagnetic wave. The discrimination section 206 selects the cluster for which the number of waveform samples that constitute the cluster is a maximum, and makes the feature quantities from the waveform samples that constitute the selected cluster the teaching data. The similarity calculation section 204 calculates the degrees of similarity between the teaching data and the feature quantities of the waveform samples newly sampled by the acquisition section 201. The determination section 207 determines that electromagnetic interference is occurring in the electromagnetic wave in a case where the degree of similarity is less than or equal to the predetermined threshold.

As a result, the electromagnetic wave discrimination device 200 can determine whether or not electromagnetic interference is occurring in the electromagnetic wave, based on the teaching data. Furthermore, the electromagnetic wave discrimination device 200 can discriminate legal electric waves and illegal electric waves, based on the teaching data.

Third Exemplary Embodiment

A third exemplary embodiment describes, using more specific examples, a configuration of a system that can distinguish if communication jamming (interference) is occurring or not in communication by cable or wireless communication, as a result of other communication, electricity, or electromagnetic noise. The third exemplary embodiment is described with reference to the first and second exemplary embodiments.

Hereunder, an exemplary embodiment for wireless communications is described. An acquisition section 201 in FIG. 8 receives an electromagnetic wave (incoming electrical wave) in which the communication signal includes disturbances such as electromagnetic noise. The receiver used at this time is a voltmeter, a field intensity meter, a spectrum analyzer, or the like. Such devices can measure the amplitude at each frequency of the electromagnetic wave. The amplitude data obtained at this acquisition section 201 is associated with the time data for the time of amplitude data acquisition, which is self-contained in the acquisition section 201 or is fetched from the exterior. Furthermore, this acquisition section 201 has a function in which sampling (measurement of the frequency and the amplitude value) is repeated at each predetermined time.

The acquisition section 201 sends the acquisition data for every sampling to the feature quantity calculation section 202. The feature quantity calculation section 202 calculates the APD (amplitude probability distribution). The APD is a feature quantity that, based on the amplitude value data and the acquisition time data sent from the acquisition section 201, is obtained by the ratio between the time in which it exceeds a prescribed amplitude value, and the entire measurement time.

Figure 11:
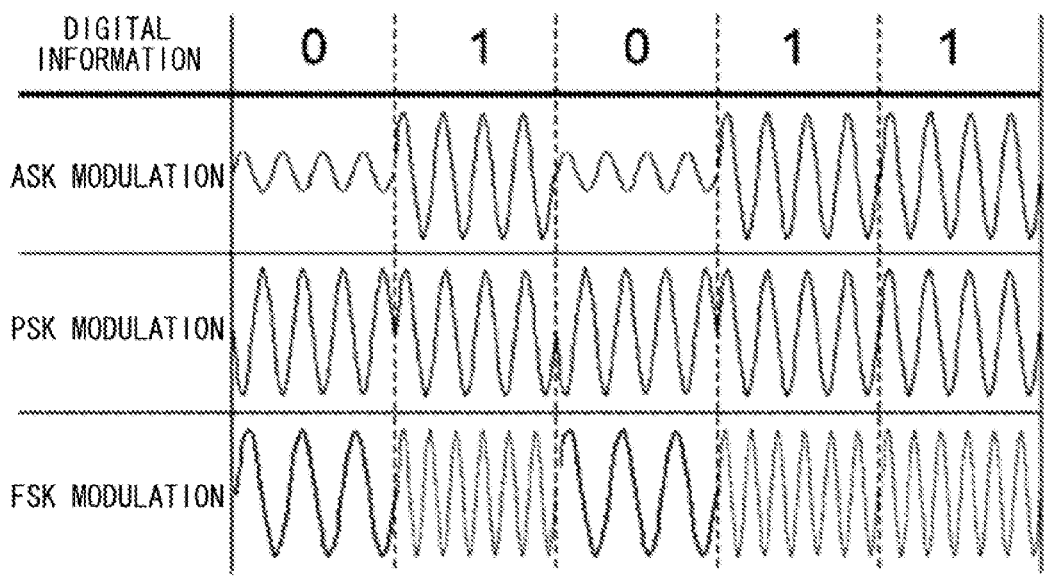
FIG. 11 is a conceptual diagram showing the difference in signal waveforms due to a modulation method, in a third exemplary embodiment of the present invention.

Here, since the calculated feature quantity is largely influenced by the amplitude value, it differs for every modulation method (refer to FIG. 11 for example). Furthermore, even if it is the same modulation method, changes in the feature quantity thereof occur according to the degree of interference, or in other words, communication jamming.

Figure 12:
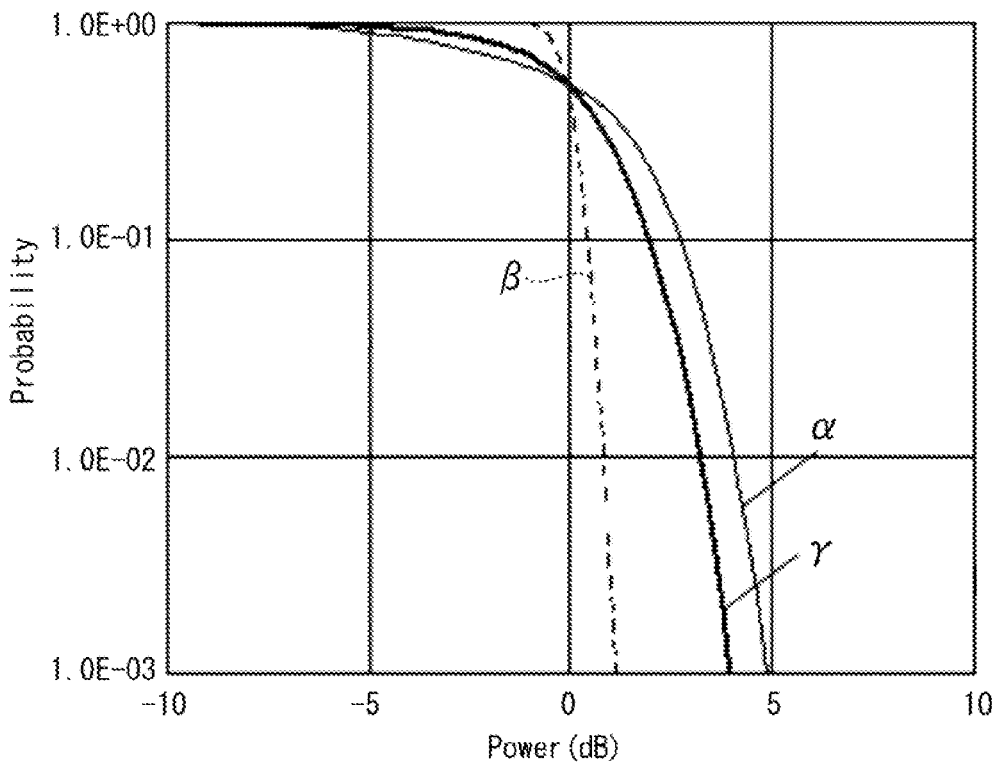
FIG. 12 is a diagram showing an example of where ADP is computed as the amplitude feature quantity, in the third exemplary embodiment of the present invention.

As an example, a case is described where, with respect to a communication A using PSK as the modulation method, a communication B using FSK is causing interference. FIG. 12 shows the affected wave a (communication A), the interfering wave β (communication B), and the synthesized wave γ (communication A+communication B). In regard to the APD calculated by the feature quantity calculation section 202, a difference like that shown in FIG. 12 occurs in the case where the communication A and the communication B are respectively received only as single-waves (affected wave α, interfering wave β), and in the case where interference is occurring (synthesized wave γ). The electromagnetic interference is discriminated using this difference in the distribution.

Figure 13:
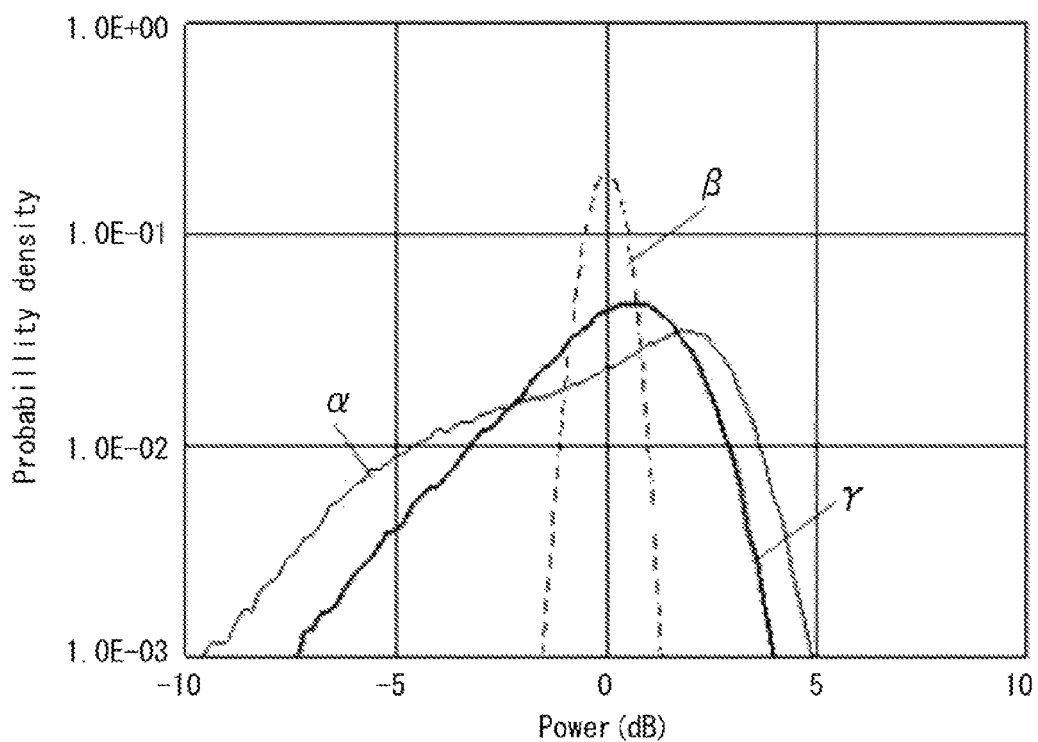
FIG. 13 is a diagram showing an example of where the amplitude histogram is computed as the amplitude feature quantity, in the third exemplary embodiment of the present invention.

An amplitude histogram such as that shown in FIG. 13 may be used as the feature quantity. The amplitude histogram is the derivative of the APD, and a more highly sensitive discrimination is possible with respect to fluctuations in the amplitude.

The feature quantity calculation section 202 stores the feature quantity data calculated by such a process for every waveform sample in a storage section 203. In the storage section 203, the feature quantity obtained by the feature quantity calculation section 202 is quantified and stored. If time data for the time of data acquisition is included in the data received from the feature quantity calculation section 202, it is possible to know the time the interference, or in other words, jamming, occurred. FIG. 2 shows an example of the data to be stored in the storage section 203.

The similarity calculation section 204 performs a process for discriminating the difference in the feature quantity obtained by the feature quantity calculation section 202. For the purpose of discriminating the occurrence of communication jamming (interference) as a result of communications, electricity, or electromagnetic noise, the acquisition section 201 repeats the measurement for the monitoring of interfering waves, and the feature quantity calculation section 202 calculates the feature quantity each time. In order to determine if a change in the strength of the interference occurred in such a state, the similarity calculation section 204 performs a process that digitizes the similarity between the feature quantities. FIG. 3 is a flowchart showing the sequence of the data processing in the degree in the similarity calculation section 204. The process here is a method that is generally used in statistical processing, in which a correlation coefficient showing the degree of similarity between two variables is used. The calculation method of the correlation coefficient is shown in Formula (1). The closer the number is to 1, the higher the similarity of both feature quantities, and it can be determined that they are related to the same electromagnetic wave component. The Pearson's correlation coefficient C(x, y) is defined by Formula (1) when a data set (x, y)={(xi, yi)} (i=0, 1, . . . , n) composed of two pairs of numerical values is applied.

$$C(x, y) = \frac{\sum_{i=1}^{N}(x_i - \overline{x})(y_i - \overline{y})}{\sqrt{\sum_{i=1}^{N}|x_i - \overline{x}|^2}\sqrt{\sum_{i=1}^{N}|y_i - \overline{y}|^2}}$$

Formula (1)

As a result of this process, a correlation matrix is created. The correlation coefficients for all combinations are calculated with respect to the waveform samples, to which discrimination information has been added. The similarity calculation section 204 stores the calculated data in the storage section 203. FIG. 4 shows an example of the data to be stored in the storage section 203.

Figure 14:
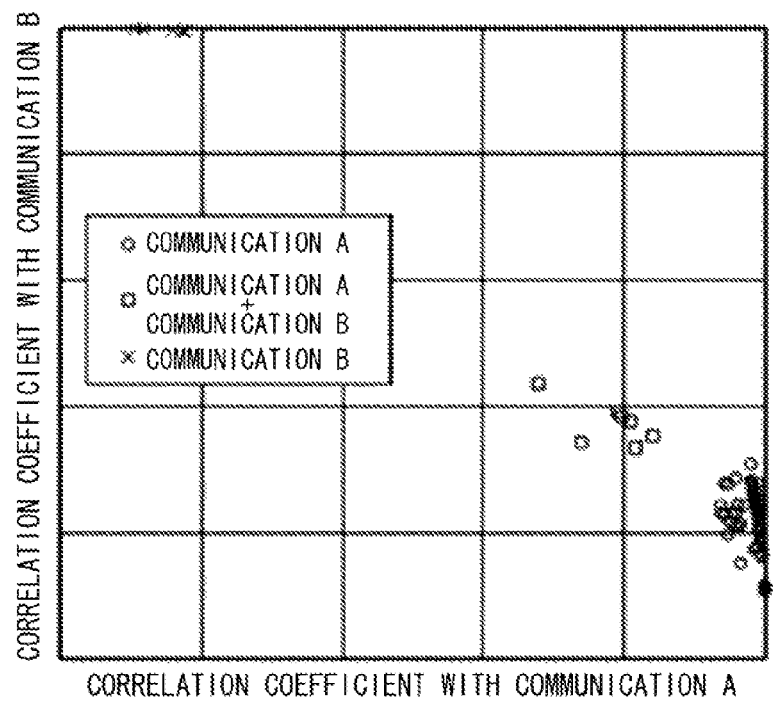
FIG. 14 is a diagram showing an example of results for where the feature quantities are mapped by a classification section, in the third exemplary embodiment of the present invention.

Next, the classification section 205 applies cluster analysis based on the above correlation matrix in order to classify the waveform samples into cluster groups. By clustering each of the waveform samples with high similarities with respect to the correlation matrices, classification of each of the feature quantities, or in other words, classification of each of the electromagnetic wave components, becomes possible. The clustering used here is executed for example by the method shown in the flowchart of FIG. 5 in the first exemplary embodiment. The analysis results are shown in FIG. 14. By taking the two waveform samples (the waveform sample of the interfering wave and the waveform sample of the affected wave) that have the lowest degree of similarity from the aforementioned correlation matrix as the axes, a highly accurate classification is possible. In FIG. 14, the symbol "○" indicates communication A, the symbol "□" indicates communication A+communication B, and the symbol "×" indicates communication B.

Figure 15:
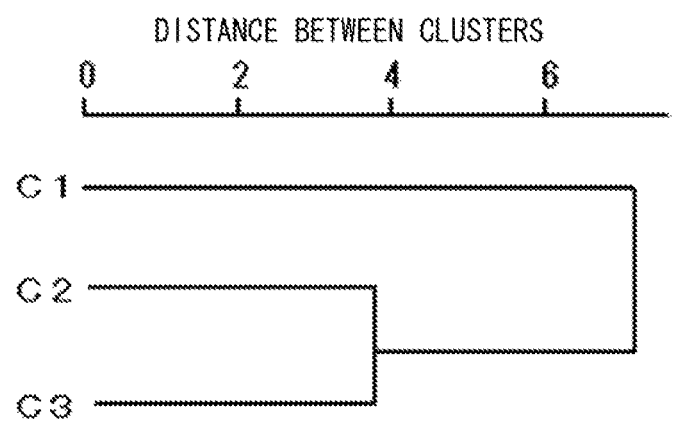
FIG. 15 is a diagram showing an example of the results of hierarchical cluster analysis by the classification section, in the third exemplary embodiment of the present invention.

In addition, as the method of clustering, methods known as non-hierarchical cluster analysis, or hierarchical cluster analysis methods are appropriately selected. An example of the analysis results of hierarchical cluster analysis is shown in FIG. 15. FIG. 15 is a cluster dendrogram. The cluster analysis results calculated by the classification section 205 are output to the discrimination section 206.

Figure 16:
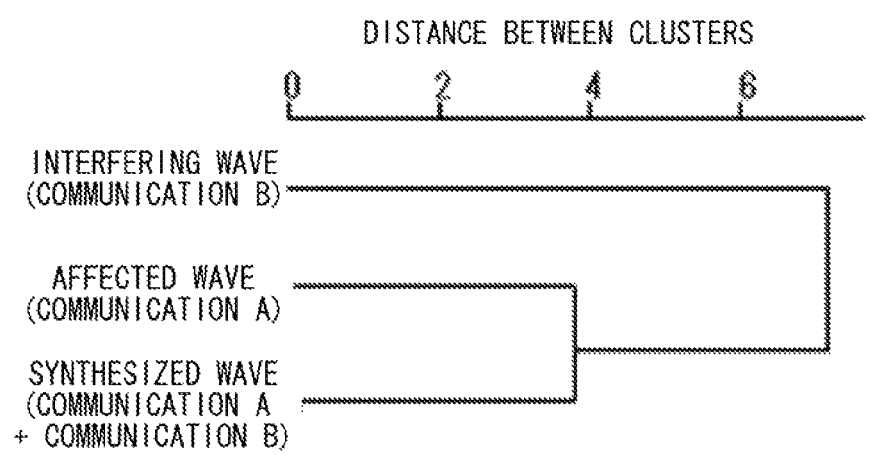
FIG. 16 is a diagram showing an example of where the electromagnetic wave components constituting the cluster are specified by the discrimination section, in the third exemplary embodiment of the present invention.

The discrimination section 206 performs discrimination for selecting the teaching data from the classified cluster groups, based on the analysis results in the classification section 205. As the discrimination method, it is effective to refer to the frequency of occurrence of illegal electric waves and legal electric waves (interfering waves and affected waves). Since the frequency of occurrence of the illegal electric waves is expected to be a fraction of that of the legal electric waves, the number of waveform samples that constitute the cluster group are counted, and the cluster group that includes the most acquisitions of the waveform can be specified as the cluster group that includes the waveform sample of the legal electric wave (refer to FIG. 16).

Next, the waveform data to become the teaching data is selected from the cluster selected in this manner, which includes the legal electric wave. As the selection method, for example, a method that calculates the centroid of the cluster of the waveform data group and selects the waveform data that is the closest distance from the centroid, or the like, can be used (refer to FIG. 9). The parameter information of the selected waveform data is searched from within the waveform samples stored in the storage section 203, and is newly recognized as waveform parameters that serve as teaching data.

The cluster discrimination results, which are the processing results of the discrimination section 206, and the feature quantities of the selected teaching data are output to the determination section 207. Furthermore, the results may be output to an external display device.

Next, the description of the process that automatically detects electromagnetic interference based on the teaching data selected from the storage section 203 is continued. Based on the feature quantities of the electric waves received at each predetermined time, which are newly sampled by the acquisition section 201 (that is, new waveform samples), and the teaching data stored in the storage section 103, the similarity calculation section 204 calculates the degree of similarity therefrom. The Pearson's correlation coefficient shown in Formula (1) is used in the degree of similarity calculation section 204. However, since the processing here is different from the above-described processing of the similarity calculation section 204 in that teaching data selected as the correlation basis is used, there is no need to calculate the correlation coefficients mutual to all of the waveform data. The correlation coefficients of the waveform data of the received electric waves, in which the teaching data serves as the correlation basis, are successively output at each predetermined time.

The determination section 207 determines whether or not interference is occurring with respect to the electric wave received at each predetermined time, which is sampled by the acquisition section 201, by comparing the sizes of a predetermined threshold and the degree of similarity. FIG. 10 is a flowchart showing the sequence in the determination section 207. In the case where electromagnetic interference is occurring in the electromagnetic wave, the degree of similarity decreases as a result of changes in the APD or the amplitude histogram, which are feature quantities, from the influence of electromagnetic interference. Consequently, by comparing the size relationship between the preset threshold and the degree of similarity, the determination section 207 can determine whether or not electromagnetic interference is occurring in the electromagnetic wave.

Figure 17:
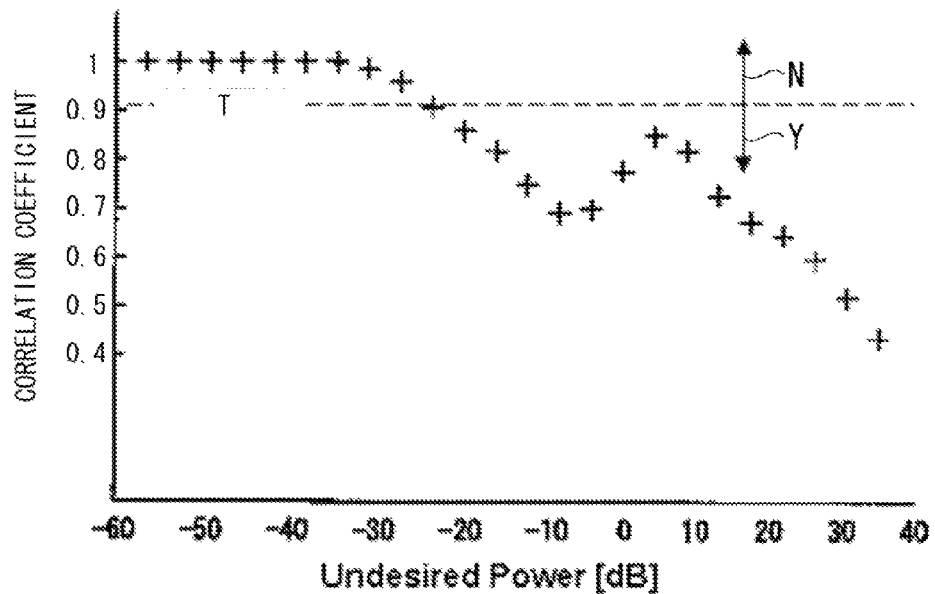
FIG. 17 is a diagram showing changes in the correlation coefficient according to the magnitude of the interference strength, in the third exemplary embodiment of the present invention.

In FIG. 17, the feature quantities in cases where only affected waves with minor interference are received serve as the teaching data, and shown is the dependence of the interfering wave strength on the correlation coefficient. In regard to FIG. 17, there is interference if the correlation coefficient is smaller than a detection threshold T (symbol Y), and there is no interference if the correlation coefficient is larger than the detection threshold T (symbol N). As is shown in FIG. 17, as the interference strength increases, the correlation coefficient decreases. By setting the threshold, which is determined according to the degree of interference, the occurrence of interference can be automatically determined in cases where a correlation coefficient smaller than the threshold is calculated.

Figure 18:
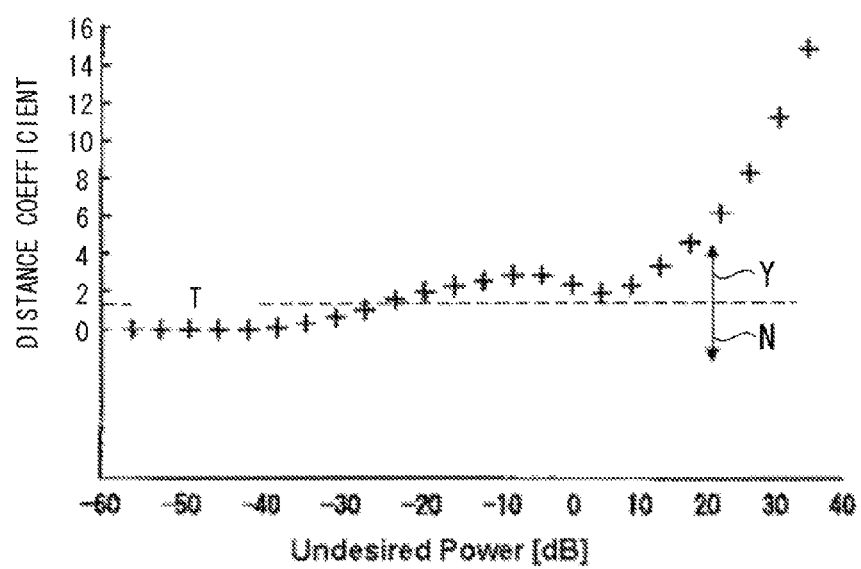
FIG. 18 is a diagram showing changes in the distance function according to the magnitude of the interference strength, in the third exemplary embodiment of the present invention.

Although a Pearson's correlation coefficient was used as the degree of similarity calculated in the similarity calculation section 204, it is in no way limited to this, and, as mentioned above, a distance function may be used. In FIG. 18, the feature quantities in cases where only affected waves with minor interference are received serve as the teaching data, and shown is the dependence on the interfering wave strength in a case where the Euclidean distance is used as the distance function. In FIG. 18, there is interference if the distance function is larger than the detection threshold T (symbol Y), and there is no interference if the distance function is smaller than the detection threshold T (symbol N). It is a distribution in which the distance increases as the interfering wave strength becomes larger, and by setting the threshold, in the same manner, it can be understood that the detection of interfering wave generation is possible.

With respect to the setting of the threshold, which determines the interference, it is appropriately selected according to the desired interference strength to be determined. The threshold may be automatically set based on the cluster analysis results of the discrimination section 206. As exemplified in FIG. 16, as a result of the discrimination results, information regarding the degree to which the cluster of the affected wave and the cluster of the synthesized wave, which is receiving interference, are separated can be obtained. In the example of a hierarchical cluster analysis in FIG. 16, the distance between the affected wave and synthesized wave clusters is approximately 3.8. As a result, by setting the threshold in the determination section 207 to half (1.9) of the distance between clusters for example, the threshold can be determined automatically (refer to FIG. 18). However, it is necessary to match the function definition used as the degree of similarity between the degree of similarity used in cluster analysis in the classification section 205 and the degree of similarity used in the determination of interference generation.

The output section 208 may be, for example, a display or a printer, or an alarm that notifies the interference generation. The output section 208 outputs to the effect that electromagnetic interference is occurring in the electromagnetic wave, in a case where the determination section 207 determines that electromagnetic interference is occurring in the electromagnetic wave.

According to the electromagnetic interference detection device of the exemplary embodiment of the present invention, based on the measurement data of the arriving electric waves, the waveform data that serves as the teaching data (the APD or the amplitude histogram of the affected wave for example) is automatically discriminated and selected by means of cluster analysis. Furthermore, by calculating the degree of correlation between the teaching data and the arriving electric wave, and comparing the degree of correlation with a predetermined threshold, the existence of a generated electromagnetic interfering wave is automatically determined.

Consequently, it can be automatically determined (detected) whether or not electromagnetic interference is occurring, and it is effective for application to an electric wave monitoring system. Furthermore, since it can be achieved with a simple configuration, it is suitable for loading to an illegal electric wave searching facility.

Above, although here electromagnetic waves were considered in the case of wireless communications, equivalent effects can be obtained in the case of cable communications by substitution with electric signals.

Above, although the exemplary embodiments of the present invention have been described in detail with reference to the drawings, the specific configuration is in no way limited by these exemplary embodiments, and includes designs, or the like, that do not depart from the gist of the present invention.

For example, the degree of similarity is not limited to a Pearson's correlation coefficient. The degree of similarity may be a Kendall's rank correlation coefficient or a Spearman's rank correlation coefficient for example. Furthermore, the degree of similarity may be expressed by a distance function (degree of dissimilarity). In this case, the distance function may be a Euclidean distance, a Chebychev distance, a Manhattan distance, a Canberra distance, or a Minkowski distance. In a case where the degree of similarity is expressed by a distance function, if the distance function is above a predetermined threshold in step Sc3 of FIG. 10, the output section notifies that electromagnetic interference is occurring in the electromagnetic wave.

Furthermore, the classification section may map the results from classification into clusters, and output the mapping results (refer to FIG. 7) to an external display device for example.

Moreover, for example, the classification section may delete one of the waveform samples for combinations in which the degree of similarity is above the predetermined threshold. Furthermore, the classification section may determine the variables to be used for classification by determining the composition of variables that are orthogonal by principal component analysis and factor analysis.

Moreover, for example, following creation of effective teaching data, the teaching data creation section may be detached from the electromagnetic wave discrimination device as long as the electromagnetic environment (electric wave usage status) does not change. As a result, the electromagnetic wave discrimination device is made compact, and it becomes easier to load it on illegal radio searching vehicles that determine the location of illegal electric wave sources.

Moreover, for example, the classification section may classify the waveform samples into clusters, based on the measurement date (time received) when the waveform sample was sampled. The measurement date becomes an effective feature quantity in a case where electromagnetic waves that are constantly utilized (mobile phones, television, and radio for example) and electromagnetic waves that are suddenly generated (police radio, fire department radio, and ambulance radio for example) are to be discriminated. As a result, in the electromagnetic wave discrimination device, if the measurement date is compared together with the analysis result of the degree of similarity, namely a statistical quantity such as amplitude of the waveform, the accuracy in which the electromagnetic waves are discriminated can be improved.

Furthermore, for example, the classification section may select three or more waveform samples for which the degrees of similarity are a minimum (step Sa2 in FIG. 5). For example, in a case where the classification section selects three or more waveform samples for which the degrees of similarity are a minimum, a classification (cluster analysis) using multi-dimensional variables in which the respective degrees of similarity between the waveform samples are made the variables, may be executed.

Furthermore, for example, the output section may display the clusters that were classified by a three-dimensional variable in a three-dimensional graph. As a result, the user is able to visually grasp the discriminated electromagnetic waves.

Moreover, for example, the information that shows the predetermined frequency and time in which the electromagnetic waves are received, may be stored beforehand in an external storage medium, or the like.

A program for realizing the device described above may be stored on a computer readable-storage medium, and it may be executed by reading the program thereof into a computer system. The "computer system" referred to here includes an OS and hardware, such as peripheral devices. Furthermore, the "computer readable storage medium" refers to portable media, such as a flexible disk, a magnetic optical disk, a ROM, or a CD-ROM, or a storage device, such as a hard disk that is built into a computer system. Furthermore, the "computer readable storage medium" includes those that retain the program for a fixed time, such as in the volatile memory (RAM) in the interior of a computer system that becomes the server or client in a case where the program is transmitted via a network, such as the Internet, or a communication cable, such as a phone cable. Moreover, the aforementioned program may be transmitted from a computer system that stores this program on a storage device or the like, to another computer system via a transmission medium or by carrier waves within the transmission medium. Here, the "transmission medium" that transmits the program is a medium that has a functionality for transmitting information, namely a network (communication network), such as the Internet, or a communication cable (communication line), such as a phone cable. Furthermore, the aforementioned program may be for realizing a portion of the functionalities mentioned above. Moreover, it may be one that realizes the functionality mentioned above in combination with a program that is already stored on the computer system, namely a differential file (differential program).

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

What is claimed is:

1. An electromagnetic wave discrimination device that discriminates electromagnetic waves, comprising:
    an acquisition section that receives communication signals of a predetermined frequency, and samples waveform data of the communication signals every predetermined time to obtain sample data for each predetermined time;
    a feature quantity calculation section that calculates amplitude feature quantities for each predetermined time, based on the sampling data for each predetermined time;
    a similarity calculation section that calculates degrees of similarity with respect to the amplitude feature quantities for each predetermined time;
    a classification section that classifies the communication signals for each predetermined time into clusters to obtain cluster analysis results of the communication signals for each predetermined time, based on the degrees of similarity;
    a discrimination section that discriminates communication signals constituting one cluster for each of the clusters to obtain discrimination results, based on the cluster analysis results of the communication signals for each predetermined time;
    an output section that outputs the discrimination results; and
    a storage section that stores the amplitude feature quantities, the degrees of similarity, the cluster analysis results, and the discrimination results.

2. The electromagnetic wave discrimination device according to claim 1,
    wherein the discrimination section discriminates communication signals constituting one cluster for each of the clusters to obtain discrimination results, based on the cluster analysis results of the communication signals for each predetermined time obtained, and selects teaching data from the amplitude feature quantities for each predetermined time, stored in the storage section, based on the discrimination results, and
    the electromagnetic wave discrimination device further comprises:
    a determination section that determines whether or not interference is occurring in communication signals, by comparing a predetermined threshold with a degree of similarity between the teaching data selected by the discrimination section, and an amplitude feature quantity newly sampled by the acquisition section and calculated by the feature quantity calculated section.

3. The electromagnetic wave discrimination device according to claim 1, wherein the amplitude feature quantities include amplitude probability distribution and an amplitude histogram of the sampling data for each predetermined time in the acquisition section.

4. The electromagnetic wave discrimination device according to claim 2, wherein the discrimination section automatically determines the threshold in the determination section, based on a distance between the clusters in the cluster analysis results.

5. The electromagnetic wave discrimination device according to claim 1, wherein the discrimination section discriminates the electromagnetic waves based on at least one of a reception frequency and reception time of a communication signal.

6. An electromagnetic wave discrimination method for an electromagnetic wave discrimination device that discriminates electromagnetic waves, the method comprising:
    receiving communication signals of a predetermined frequency, and sampling waveform data of the communication signals every predetermined time to obtain sample data for each predetermined time;
    calculating amplitude feature quantities for each predetermined time, based on the sampling data for each predetermined time;
    calculating degrees of similarity with respect to the amplitude feature quantities for each predetermined time;
    classifying the communication signals for each predetermined time into clusters to obtain cluster analysis results of the communication signals for each predetermined time, based on the degrees of similarity;
    discriminating communication signals constituting one cluster for each of the clusters to obtain discrimination results, based on the cluster analysis results of the communication signals for each predetermined time;
    outputting the discrimination results; and
    storing the amplitude feature quantities, the degrees of similarity, the cluster analysis results, and the discrimination results.

7. A non-transitory computer-readable storage medium storing an electromagnetic wave discrimination program which makes a computer execute:
    an acquisition function of receiving communication signals of a predetermined frequency, and sampling waveform data of the communication signals every predetermined time to obtain sample data for each predetermined time;
a feature quantity calculation function of calculating amplitude feature quantities for each predetermined time, based on the sampling data for each predetermined time;
a similarity calculation function of calculating degrees of similarity with respect to the amplitude feature quantities for each predetermined time;
a classification function of classifying the communication signals for each predetermined time into clusters to obtain cluster analysis results of the communication signals for each predetermined time, based on the degrees of similarity;
a discrimination function of discriminating communication signals constituting one cluster for each of the clusters to obtain discrimination results, based on the cluster analysis results of the communication signals for each predetermined time;
an output function of outputting the discrimination results; and
a storage function of storing the amplitude feature quantities, the degrees of similarity, the cluster analysis results, and the discrimination results.

* * * * *